United States Patent [19]
Crawford, deceased et al.

[11] Patent Number: 5,308,122
[45] Date of Patent: May 3, 1994

[54] TUBE COUPLING

[75] Inventors: Cullen B. Crawford, deceased, late of Euclid; Carole C. Hahl, executrix, Novelty, both of Ohio

[73] Assignee: Tylok International, Inc., Cleveland, Ohio

[21] Appl. No.: 908,043

[22] Filed: Jul. 6, 1992

[51] Int. Cl.⁵ .............................................. F16L 19/02
[52] U.S. Cl. .................................. 285/52; 285/332.4; 285/342; 285/354
[58] Field of Search ................ 285/50, 52, 354, 332.4, 285/54, 342, 343

[56] References Cited

U.S. PATENT DOCUMENTS

| | | | |
|---|---|---|---|
| 771,682 | 10/1904 | Sussman | 285/332.4 X |
| 2,189,566 | 2/1940 | Kreidel | 285/332.4 |
| 2,211,776 | 8/1940 | Haury | 285/354 |
| 2,333,909 | 11/1943 | Williams | 285/332.4 |
| 2,444,622 | 7/1948 | Wolfram | 285/332.4 |
| 2,473,118 | 6/1949 | Wolfram | 285/342 |
| 2,669,465 | 2/1954 | Newell | 285/354 X |
| 2,757,943 | 8/1958 | Henderson | 285/354 X |
| 2,950,928 | 8/1960 | Bowan | 285/354 X |
| 3,219,367 | 11/1965 | Franck | 285/354 X |
| 3,232,648 | 2/1966 | Franck | 285/344 X |
| 3,239,247 | 3/1966 | Pickert | 285/354 X |
| 3,434,744 | 3/1969 | Yoke et al. | 285/52 |
| 3,561,794 | 2/1971 | Dobbelgere | 285/52 |
| 4,484,770 | 11/1984 | Sloane | 285/354 |

FOREIGN PATENT DOCUMENTS

| | | | |
|---|---|---|---|
| 779832 | 3/1968 | Canada | 285/52 |
| 2005005 | 8/1971 | Fed. Rep. of Germany | 285/52 |
| 709779 | 6/1966 | Italy | 285/52 |

OTHER PUBLICATIONS

Military Standarington Handbook MIL-HD-BK-700[MR]Nov. 1, 1965 on Plastics pp. 35–41.

Primary Examiner—Randolph A. Reese
Assistant Examiner—Heather Chun
Attorney, Agent, or Firm—Renner, Otto, Boisselle & Sklar

[57] ABSTRACT

A tube coupling is disclosed which electrically insulates the tube from the coupling. A metallic nut and body interact with a non-metallic coupling to constrict the non-metallic coupling about the tube end providing multiple seals and seats while avoiding metal-to-metal contact between the tube and either the nut or body. Multiple cooperating cam surfaces are provided on the body and non-metallic coupling to achieve a tube coupling stronger than, yet electrically insulated from, the tube.

13 Claims, 1 Drawing Sheet

TUBE COUPLING

DISCLOSURE

This invention relates generally as indicated to a tube coupling and more particularly to a precision metal tube coupling which is electrically insulated from the tube end coupled.

BACKGROUND OF THE INVENTION

The mechanism of corrosion has been determined to be electrochemical in nature. The corrosion of underground metal structure or even structure exposed to moisture in the atmosphere is the result of cathodic disbondment or ions flowing from the metal structure to the surrounding electrolyte. Corrosion is particularly hard on underground pipes or conduits, such as gas distribution systems. Corrosion is also particularly hard on fittings used in such systems. The extent of corrosion may vary widely throughout a distribution system and depends on many factors such as the chloride content or acidity of the soil or surrounding electrolyte.

Cathodic protection systems are employed to minimize corrosion. These systems are either galvanic or of the impressed current type. The former utilizes a natural current flow between metals of different types while the latter actually impresses a current through the electrolyte from an anode to the buried structure as a cathode. The anode then corrodes rather than the buried structure. One drawback of the latter system is that it must from time to time be tested. Testing takes place by measuring the potential from a reference cell to the structure with the system off.

It has been found that fittings for such systems won't corrode in typical fashion if one side is electrically insulated from the other. In other words, if the tube connected is electrically insulated from the fitting, the fitting is insulated from the cause of corrosion. An insulated fitting also makes cathodic protection for the system easier to apply, control and monitor.

While there are many plastic fittings or fittings using plastic parts, such as a typical garden hose connection, the really quality fittings more suitable for a gas distribution system are such as those used in process control piping. Such fittings are made of metal. Examples of such fittings are seen in prior U.S. Pat. Nos. 3,736,008 and 3,069,188 and are sold under the well known TY-LOK® trademark by Tylok International Inc. of Euclid, Ohio. These fittings typically comprise a precision made body, a nut and two collets, the latter providing four axially spaced sealing points along the tube. The nut is spaced from the tube since the rear collet includes a sleeve telescoped between the nut and tube. The body includes different axially spaced cam or taper surfaces which actuate the collets. The fitting when properly installed is substantially stronger than the tube. Since the collets actually skive into the tube, the fitting is a good electrical conductor, and in some applications that electrical conductivity is desirable.

It would therefore be desirable to maintain the strength and integrity of the fitting using interchangeable parts, such as the nut and body, yet providing a fitting which electrically insulates the fitting from the tube.

SUMMARY OF THE INVENTION

The present invention provides a tube coupling which comprises a metallic body, a non-metallic annular coupler adapted to fit within the body surrounding a tube to be coupled to the metal body, and a metallic nut threaded on the body and engaging the coupler to drive the coupler into the body when tightened. The body and coupler are designed to distort the coupler around the tube to provide at least two axially spaced points or areas of high sealing pressure while electrically insulating the tube from the body.

The body includes two axially spaced taper interior surfaces and the non-metallic coupler includes two corresponding axially spaced taper exterior surfaces which seat against each other when the nut is finger tightened. When the nut is fully tightened it drives the non-metallic coupler into the body along with the tube until the coupler engages an undercut seat on the body. The interfitting taper surfaces distort the coupler to grip the O.D. of the tube near its end by substantial pressure over a substantial length while at the same time providing two axially spaced seal and seat areas between the outside of the coupler and the body. Two additional seal and seat areas are provided, one between the coupler end and the undercut seat, and one between the tightened nut and a flange on the coupling. Thus four axially spaced seals are provided. The coupler includes at its inner end a thick inwardly directed flange spacing the end of the tube from the body, and at the outer end a sleeve extending between the nut and tube. The non-metallic coupling electrically shields the tube from both the nut and body. The coupler is preferably made of nylon or Teflon, or other plastic having lubricity characteristics. The metal nut and body may typically be brass, stainless steel or other corrosion resistant alloy, for example.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

DETAILED DESCRIPTION OF THE PREFERRED EMBODIMENTS

Figure 1:
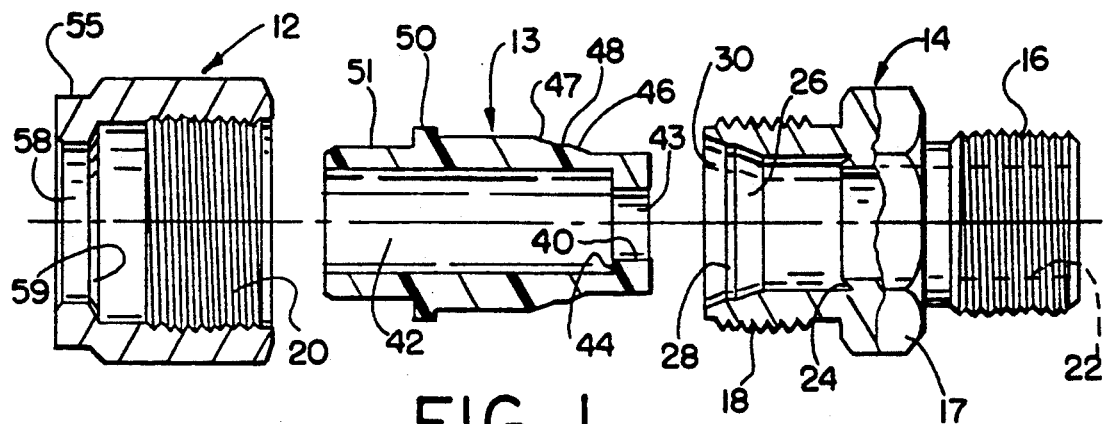
FIG. 1 is an exploded view partially in section of the three parts of the coupling of the present invention.

Referring initially to FIG. 1 there are illustrated the components of a coupling 10 in accordance with the present invention. Such components comprise the metallic nut 12, the non-metallic coupling member 13 and the metallic body 14. The body 14 is generally cylindrical in configuration and includes an externally threaded pipe end 16 adjoining a flatted hexagonal section 17 which is in the approximate middle of the body. On the nut end of the body there is provided external nut receiving threads 18 which mesh with the internal threads 20 of the nut 12.

The body 14 is provided with an internal passageway 22 which is of internal uniform diameter from the pipe end through the flatted section 17. Adjacent the nut end of the flatted section, the passageway expands in an undercut seat indicated at 24. The somewhat now enlarged passageway continues at a uniform diameter to a first cam surface or conical sloping surface indicated at 26. The sloping surface 26 continues to a relatively short section indicated at 28 of uniform diameter which continues to a final or second sloping or conical cam surface 30 which forms the flared mouth of the nut end of the body. The cone angles of the two cam surfaces may be slightly different, or they may be the same. In the illustrated embodiment the two cone angles are each 20°.

The non-metallic coupling member 13 is also generally tubular in configuration and includes at one end a relatively thick inwardly directed flange 40. The internal passage 42 through the coupling member is of uniform diameter except for the constricted portion 43 formed by the internal shoulder 44. The external surface of the coupling member includes two sloping cam surfaces indicated at 46 and 47, such sloping surfaces being slightly axially separated by a cylindrical surface 48 therebetween. The external surface of the coupling member continues rearwardly at the enlarged diameter afforded by the sloping cam surfaces 46 and 47 to a radially projecting flange 50. Beyond such flange 50 a reduced diameter sleeve projects as indicated at 51.

The body of the nut includes the flatted external hexagonal surface 54 and a reduced diameter non-threaded end indicated at shoulder 55, such end including an inwardly directed flange 58 which has a sloping interior surface 59.

Figure 2:
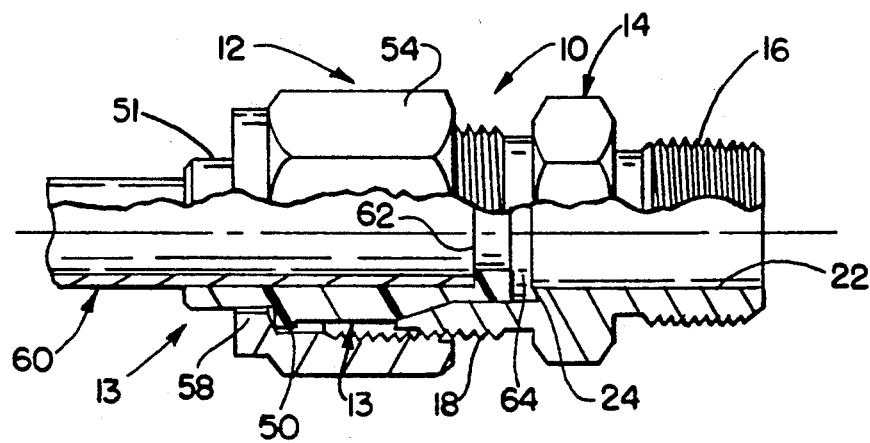
FIG. 2 is a similar fragmentary view of the parts assembled on a tube and the nut finger tightened.

Referring now to FIG. 2 there is illustrated the coupling assembled, but not more than hand or finger tightened. Nut 12 and coupling member 13 have been threaded on tube end shown at 60, with the end wall of the tube abutting the internal shoulder 44 as seen at 62. In such finger tight position, the internal threads 20 on the nut and the external threads 18 on the body have engaged, and the sloping internal flange surface 59 of the nut has engaged the external flange 50 of the coupling member. The axially separated cam surfaces on the exterior of the coupling member and the interior of the body have seated against each other. There is however still a significant gap indicated at 64 between the front of the internal flange of the coupling member, and the undercut seat 24.

Figure 3:
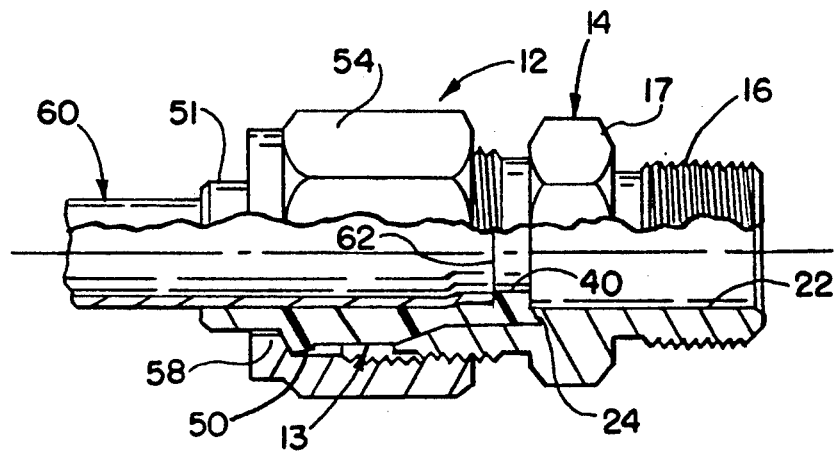
FIG. 3 is a similar view with the parts wrench tightened.

Referring now to FIG. 3, the nut has been wrench tightened with the flange on the nut somewhat distorting and driving the coupling member as well as the tube end into the body. As seen in FIG. 3 the internal sloping surface 59 of the nut engages the larger surface of the flange 50 and distorts the flange somewhat creating a force vector toward the outside of the tube and constricting the coupling member somewhat in that area. The primary pressure constriction of the coupling member is obtained by the two axially spaced sloping surfaces which create two axially spaced high pressure areas gripping the exterior of the tube essentially from its end to somewhat near the mouth of the body. Also, the inwardly extending flange on the coupling body has been driven into seating engagement with the undercut seat 24 on the body. Even though the end of the coupling member is seated against the undercut seat on the body, the tube end is still substantially axially spaced from the body seat. Also, at the nut end, the sleeve 51 extends beyond the nut telescoping through the flange 58. When the nut is properly tightened a secure seal is provided. Tests have indicated that the coupling is stronger than the tube itself. More importantly, the coupling is electrically insulated from the tubing.

When properly tightened, in addition to the pressure constriction provided by the interengaging paired cam surfaces, there is also provided a seal and seat between the coupling member and the body at the undercut seat 24. There are also provided two seals and seats between the exterior of the coupling member and the interior of the body at the two axially spaced cam surfaces. In addition, there is provided a seal and seat between the flange 50 of the coupling member 13 and the sloped internal surface 59 of the nut flange 58.

The metallic nut and body are precision turned from metal hex stock in the same manner as coupling components for the process or instrumentation control industry. Suitable metals are brass, stainless steel, aluminum, monel, Hastalloys, and titanium. When the application is underground, because of the corrosion factor it is recommended that stainless steel bodies and fittings be used.

The material of the non-metallic coupling member must of course be non-conductive and capable of withstanding the significant pressures and, to some degree, distortions to which it is subject in the tightening of the coupling. The non-metallic material will normally be selected from a plastic material depending upon the application. For the gas distribution application noted above, nylons have been found to be acceptable. Nylons or polyamides are a melt process thermoplastic with a chain structure comprising repeating amide groups. Nylons offer high strength, at elevated temperatures, toughness at low temperatures, and excellent stiffness, wear and abrasion resistance, and good chemical resistance. Nylons also have a low coefficient of friction. In fact it is preferred to have a plastic material with surface lubricity characteristics. As is known, certain fluoroplastics meet this criteria and a preferable fluoroplastic is polytetrafluoroethylene. Polytetrafluoroethylene is a completely fluorinated polymer which is made by polymerization of tetrafluoroethylene. It has a linear molecular structure of repeated $CF_2$ units and is a crystalline polymer.

It will be appreciated that other suitable materials, or blends or alloys of those materials, may be employed.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

What is claimed is:

1. A tube coupling comprising a body, a nut adapted to be threaded on said body, a non-metallic coupling member adapted to surround a tube end and be captured by said nut to be seated together with said tube into said body as said nut is tightened, cooperating cam surfaces on the exterior of said coupling member and the interior of said body operative to constrict said coupling member about said tube end as the tube and body move relative to each other, an internal abutment flange on said coupling member extending between said tube end and body adapted to be driven against a seat on said body as said nut is tightened, and an external flange on said coupling member adapted to engage an internal flange on said nut, whereby when said nut is tightened, said coupling member and internal abutment flange will be driven into engagement with said seat as said cooperating cam surfaces constrict the coupling member about said tube end, said cooperating cam surfaces comprising axially spaced annular sloping surfaces on the interior of said body, said cam surfaces being axially separated by a cylindrical non-sloping surface, and corresponding to annular sloping surfaces on the exterior of said coupling member.

2. A tube coupling as set forth in claim 1 wherein said nut and body are metallic, and said coupling member electrically insulates said tube from the balance of the coupling.

3. A tube coupling as set forth in claim 2 wherein said coupling member is formed from a plastic material having surface lubricity characteristics.

4. A tube coupling as set forth in claim 3 wherein said plastic material is nylon or polytetrafluoroethylene.

5. A tube coupling as set forth in claim 1 wherein said seat on said body is undercut.

6. A tube coupling as set forth in claim 1 wherein said coupling member includes a sleeve surrounding said tube and projecting through said internal flange on said nut.

7. A tube coupling comprising a metallic body, a non-metallic annular coupling member adapted to fit within said body surrounding a tube end to be coupled to the metal body, a nut threaded on the body and directly having an internal flange engaging the coupling member to drive the coupling member into the body when tightened, annular sloping cam surfaces on the interior of the body axially separated by a cylindrical non-sloping surface to distort the coupling member to provide multiple spaced compression seals and seats while electrically insulating the tube from the nut and body, and matching multiple annular cam surfaces on said coupling member, said cam surfaces, there being at least two annular cam surfaces axially separated on said body and coupling member, wherein each surface is a conical surface, each having the same conical angle.

8. A tube coupling as set forth in claim 7 including an internal abutment flange on said coupling member extending between said tube end and said body adapted to be driven against a seat on said body when the nut is tightened.

9. A tube coupling as set forth in claim 8 including an external flange on said coupling member adapted to engage said internal flange on said nut as said nut is tightened.

10. A tube coupling as set forth in claim 8 wherein said seat on said body is undercut.

11. A tube coupling as set forth in claim 9 wherein said coupling member includes a sleeve surrounding said tube and projecting through said internal flange on said nut.

12. A tube coupling as set forth in claim 7 wherein said coupling member is formed from a plastic material having surface lubricity characteristics.

13. A tube coupling as set forth in claim 12 wherein said plastic material selected from a group consisting of is nylon or polytetrafluoroethylene.

* * * * *